(12) United States Patent
Andriash

(10) Patent No.: US 6,242,076 B1
(45) Date of Patent: Jun. 5, 2001

(54) ILLUMINATED IMAGEABLE VISION CONTROL PANELS AND METHODS OF FABRICATING

(76) Inventor: Michael D. Andriash, Unit 1-676 Evans Court, Kelowna, British Columbia (CA), V1X 6G4

(*) Notice: Subject to any disclaimer, the term of this patent is extended or adjusted under 35 U.S.C. 154(b) by 0 days.

(21) Appl. No.: 09/245,929

(22) Filed: Feb. 8, 1999

(51) Int. Cl.$^7$ .............................. B32B 3/24; H05B 33/02
(52) U.S. Cl. ........................ 428/138; 428/131; 428/917; 257/98
(58) Field of Search .................................. 428/917, 690, 428/138, 131, 42.1, 40.1; 313/500, 510; 257/98

(56) References Cited

U.S. PATENT DOCUMENTS

| | | |
|---|---|---|
| 4,673,609 | 6/1987 | Hill ........................................ 428/187 |
| 4,923,288 | 5/1990 | Allen et al. ........................... 350/355 |
| 5,247,190 | 9/1993 | Friend et al. ........................... 257/40 |
| 5,328,809 | 7/1994 | Holmes et al. ...................... 430/321 |
| 5,399,502 | 3/1995 | Friend et al. ............................ 437/1 |
| 5,401,827 | 3/1995 | Holmes et al. ...................... 528/374 |
| 5,425,125 | 6/1995 | Holmes et al. ...................... 385/143 |
| 5,512,654 | 4/1996 | Holmes et al. ...................... 528/373 |
| 5,514,878 | 5/1996 | Holmes et al. ........................ 257/40 |
| 5,523,555 | 6/1996 | Friend et al. .................... 250/214 R |
| 5,550,346 | 8/1996 | Andriash et al. . |
| 5,653,914 | 8/1997 | Holmes et al. ................. 252/301.16 |
| 5,679,435 | 10/1997 | Andriash ........................ 219/121.72 |
| 5,683,823 | 11/1997 | Shi et al. ............................. 428/690 |
| 5,690,366 * | 11/1997 | Luciano ................................. 283/83 |
| 5,856,030 * | 1/1999 | Burrows ............................... 428/690 |
| 5,997,992 * | 12/1999 | Paul .................................... 428/195 |

OTHER PUBLICATIONS

"Organic Emitters Promise a New Generation of Displays," Forrest et al.; Laser Focus World, Feb. 1995.
"Flat and Bright," Svata Turecek, Signs Canada, Nov. 1998.

\* cited by examiner

*Primary Examiner*—Ellis Robinson
*Assistant Examiner*—Alicia Chevalier
(74) *Attorney, Agent, or Firm*—Nixon & Vanderhye

(57) ABSTRACT

A vision control panel for application to a transparent surface includes a poly-coated adhesive release liner adhered to the underside of a substrate formed of electroluminescent (EL) or luminescent material, a power supplying bus where an electroluminescent material is used, a primary coating overlying the opposite side of the substrate, a first ink receptor coating overlying the binder coating, a second ink receptor coating overlying the first ink receptor coating, a printed image on the second ink receptor coating and a protectant over-laminate. With the exception of the protectant over-laminate, the underlying layers are perforated to enable an observer on the inside of the transparent surface to see through the panel, i.e., through the perforations, while an observer on the opposite side of the panel sees only the illuminated image printed on the panel. To fabricate the panel, opaque coatings are applied to the inside margins of the perforations to prevent light from leaking EL or luminescent material through the perforations to either panel side. A non-perforated release liner is then applied to the poly-coated liner prior to applying the second ink receptor coating and subsequent to perforating. Next, the second ink receptor coating is applied over the first ink receptor coating and onto the surface portions of the non-perforated liner in registration with the perforations to dry the ink subsequently applied during printing. The non-perforated liner is removed with the ink surface portions thereof and the protectant over-laminate is subsequently applied to a surface.

23 Claims, 6 Drawing Sheets

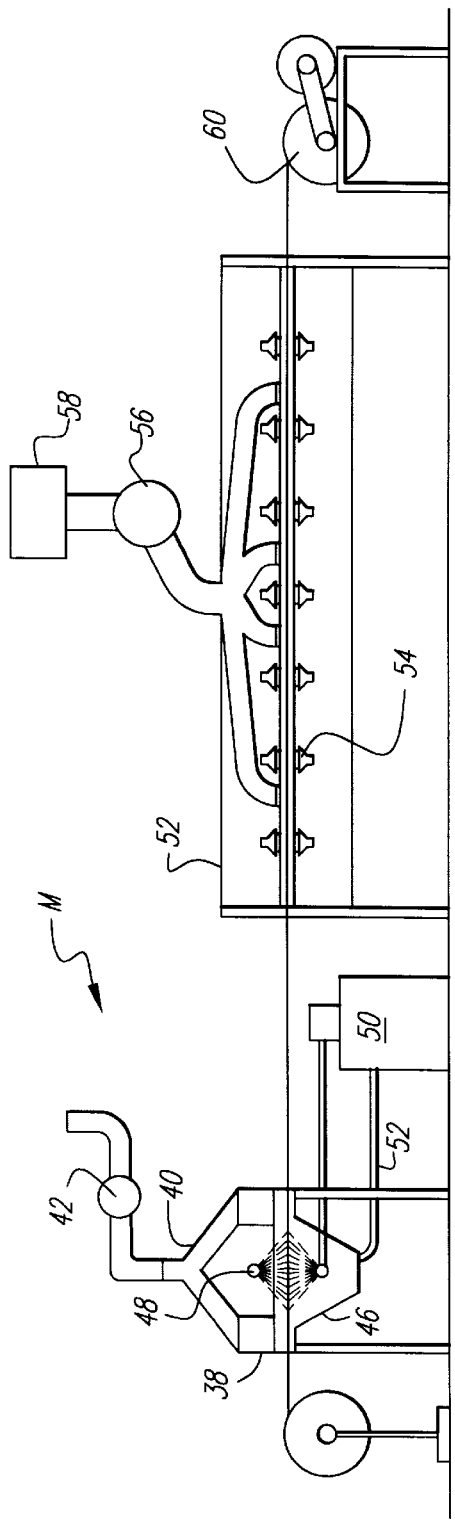
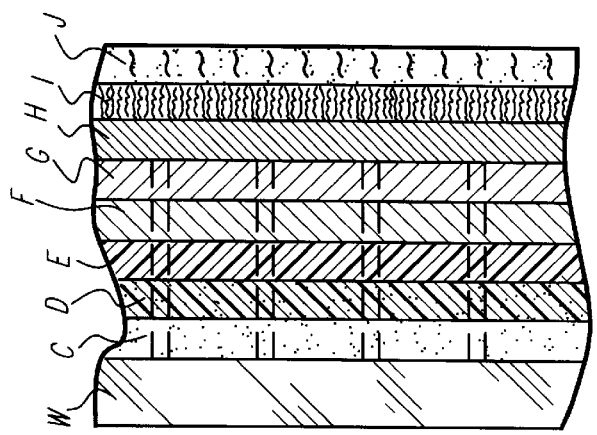
Fig.4
Fig.3

ILLUMINATED IMAGEABLE VISION CONTROL PANELS AND METHODS OF FABRICATING

TECHNICAL FIELD

The present invention relates to illuminated vision control panels, i.e., illuminated light-permeable panels, formed such that a viewer on one side of the panel can see through the panel, whereas a viewer positioned on the other side of the panel cannot readily see through the panel but, rather, sees a self-illuminated image or a message printed on the panel, and also to methods of fabricating the panels.

BACKGROUND

In my prior U.S. Pat. No. 5,679,435, issued Oct. 21, 1997, incorporated herein by reference, there is disclosed a non-self-illuminated vision control panel of this type having a substrate formed of paper or vinyl sheet material (sheetstock) with retroreflective material on one side of the sheetstock and an opaque surface on its opposite side. The retroreflective material comprises glass beads, metallized or other retroreflective particles adhered to the substrate and has a printed overlay of light-permeable material such as translucent inks defining an image on the retroreflective side of the substrate. An array of perforations, preferably laser-formed, are formed through the sheetstock, the retroreflective material and ink forming an open area through the substrate. Thus, an observer on the retroreflective side of the panel sees the printed image on the retroreflective material side. An observer on the opposite opaque side of the panel sees through the panel, i.e., through the perforations, without seeing the image. A release liner is preferably provided on the opaque side of the substrate whereby, upon removal of the release liner, the adhesive on the substrate releasably secures the vision panel to a surface, typically a transparent surface. The opposite retroreflective ink-printed side is also preferably overlaid with a sheet of protective laminate. While the foregoing described laser-perforated vision control panels have proven satisfactory, they are difficult and expensive to fabricate. Also, light on the non-image side as seen inside an office or store, e.g., security lighting, or within a vehicle, e.g., interior bus lighting, diminishes the capacity to see the image from the image side of the panel, significantly impeding viewing during the fall, winter and spring months when it is often dark at 4:30 P.M. and yet streets are crowded with potential viewers.

DISCLOSURE OF THE INVENTION

According to the present invention, there is provided apparatus and methods for fabricating a unique vision control panel which preferably includes a self-illuminating thin-sheet material such as an electroluminescent sheet material for illuminating an image side or sides of the panel. Particularly, the present invention provides a series of layers of various materials applied in a specific sequence with certain operations performed thereon to form the vision control panel. Two embodiments of final vision control panels will be described, followed by a description of methods of fabricating the panel including intermediate products.

In a first embodiment hereof, a substrate is formed which may comprise a self-illuminating thin-sheet electroluminescent (EL) sheetstock. A poly-coated, preferably paper, liner is releasably adhesively secured to a non-image side of the electroluminescent sheetstock. By poly-coated is meant that the liner is coated on one side with a plastic material such that a non-perforated adhesive liner attached thereto is easily removable at a later date by hand or machine. Preferably, the EL sheetstock has an optically clear pressure-sensitive adhesive thereon for releasable securement of the poly-coated liner and sheetstock to one another on a non-image side thereof opposite from the electroluminescent illuminating side of the EL sheetstock, i.e., opposite the image side of the resulting vision control panel. Between the pressure-sensitive adhesive and the EL sheetstock, there is provided a dark-colored floodcoat. The poly-coated paper has the plastic coating on one side and a release coating on the opposite side, for reasons which will become clear. The side opposite the image side of the panel need not have pressure-sensitive adhesive if that side is not meant to be secured to a transparent surface such as a glass, and a heat-activated removable non-perforated liner may be laminated thereto after perforation for reasons which will also become clear.

It will be appreciated that the image formed on the vision control panel may be provided by any one of a number of different printing processes. For example, ink-jet printing, i.e., using thermal, piezo or crystal jet ink-jet printing heads or solvent-based inks may be used. Alternatively, other printing processes such as silk-screening, painting, airbrushing, electrostatic transfer or thermal transfer may likewise be used. Further, the printing processes may use water-soluble inks or solvent or vinyl-based inks. Where water-soluble inks are employed on the EL sheetstock, ink-jet emulsion receptor coatings F, G and H (as described below) are used, whereas for electrostatic silkscreen, painting, airbrushing and thermal transfer printing methods, a primer coating F (as described below), is normally used. Where solvent or vinyl-based inks are employed, primer coatings are not always necessary, dependent upon whether the surface layer of the EL sheetstock is vinyl ink and/or solvent ink receptive.

On the image side, the EL sheetstock may be coated with a primer coat. Where the EL sheet material has a vinyl substrate on the image side, an acrylic or vinyl binder primer coat is applied to create a bond between the EL sheetstock and a subsequently applied ink receptor coating. The binder coat may be applied by conventional roller coating equipment. For use with water-soluble inks, the primer coating is overlaid with a conventional ink receptor coating which likewise may be applied by roller coating equipment. Where water-soluble inks of an ink-jet printer are contemplated for printing the image on the image side of the self-illuminating control panel, the receptor coating is an ink-jet emulsion receptor coating.

The sub-laminate thus formed from these various layers is then provided with a plurality of perforations. The perforations are preferably circular, have a hole diameter within a range of 0.03 to 0.25 inches and cover between 10–68% of the open area of the panel, defined by the perforations. Preferably, the perforations are formed by a laser, as set forth in my U.S. Pat. No. 5,550,346, issued Aug. 27, 1996, the disclosure of which is incorporated by reference. Alternatively, the perforations may be formed mechanically as desired.

Subsequent to perforating the sub-laminate, a dark-color floodcoat is applied into and about the margins of the perforations through the sub-laminate. That is, the coating is applied on the inside of the perforations or apertures for their full perimetrical extent, i.e., 360°. The floodcoat preferably comprises a spray of opaque paint such as vinyl paint, applied by spray nozzles located variously and at different angles to ensure that the coating is applied to the margins forming the perimeter of each perforation and for each layer.

Thus, in the preferred form, the perforations of the poly liner, the pressure-sensitive adhesive, the previously applied floodcoat, the EL sheetstock layer, the primer coat and an ink-jet receptor coating are also coated with the opaque floodcoat. Without this coating, the EL material, when activated by application of electrical current, would provide illumination about the margins of the perforations which would project or shine out the non-image side of the panel. Tiny rings of illumination would become evident, causing, in effect, illuminated halos around each perforation in the absence of coating the margins of the perforations. Such illuminated halos significantly impede the see-through capability from the non-image side to the image side of the panel. They also impede viewing the image from the image side, e.g., by washing out the image as viewed from the image side, reducing color range and resolution. The floodcoating about the margins of the perforations blocks light from the EL sheetstock from being transmitted from within each perforation to opposite sides of the panel.

For ink-jet printable applications, after perforating and applying the floodcoat spray about the margins of the perforations, a finish coat of ink receptor coating is preferably provided over the previously applied receptor coating. This second or finish receptor coating repairs minor cracks or variations surrounding the perforations caused by the perforating process and is significant in the method of fabricating the vision control panel in conjunction with a seal liner, as described below. (The seal liner does not form part of the final vision control panel used by the consumer, as will become clear.) The panel is printed using any conventional printing process to form the image on the image side of the control panel. Preferably, ink-jet printing is provided and the first and second ink-jet emulsion coatings are receptive to the ink. The ink comprises a light-permeable material overlying the EL sheetstock defining an image on the electroluminescent side of the panel. After printing, a non-perforated optically clear over-laminate sheet is applied to the image side, e.g., when used in outside weather conditions. The vision control panel is then ready for use by the end user upon connecting a power source to two electroluminescent light bus strips, for conducting electricity to the electrodes of the EL sheetstock.

As noted previously, the foregoing described vision control panel is fabricated in accordance with the present invention in a specific sequence of steps, with the above-described and other materials being applied at various stages to form the panel. Particularly, the EL sheetstock and the poly-coated liner are secured to one another on the non-image side using pressure-sensitive adhesive with the dark-colored floodcoating therebetween. Alternatively, a dark-colored pigmented pressure-sensitive adhesive may be substituted for the floodcoat. A primer layer may then be applied to the substrate on the image side by lamination or by conventional inkjet bar or spray coating equipment, first applying an optically clear primer if the EL sheetstock base color is white or other white translucent primer if the base EL sheetstock is any color other than white, e.g., pink, green, etc., followed by the first ink receptor coating, preferably an ink-jet receptor emulsion where ink-jet printing is contemplated.

At this stage in the fabrication process, there is provided a sub-laminate comprised of, from bottom to top, a poly-coated release liner, an optically clear pressure-sensitive adhesive, a dark-colored floodcoat (alternatively, a dark color pigmented adhesive in lieu of the optically clear adhesive and dark-colored floodcoat), the EL sheetstock, a binder, e.g., an optically clear acrylic or vinyl binder primer and the first ink receptor coating. That sub-laminate is then perforated. For example, a rotary die, or step and repeat mechanical dies may be used to achieve a perforated structure or laser perforations as are provided in accordance with the aforementioned patents. The perforations are sized and distributed to form an open area through the panel of between approximately 10–68% of the panel area, depending upon the applicable viewing requirements of the end user.

Next, and importantly, an opaque floodcoat is applied, preferably sprayed, into the perforations of the sub-laminate to coat the margins, i.e., the inside perimeters, of the perforations. As indicated previously, this coating precludes light emission from about the perimeters of the perforations into the perforations, prevents illumination from the non-perforations on non-image and image sides of the panel and eliminates tiny rings of illumination which would otherwise appear about non-coated perforations.

Next, and also importantly, a non-perforated heat-activated release or seal liner is applied to the perforated sub-laminate on the poly-coated side by passing the sub-laminate and non-perforated liner through a heated roller laminator, in which only one roller is heated. Particularly, a non-perforated seal liner is applied to overlie the first release liner (the poly-coated paper) with the non-perforated seal liner being exposed directly to the single heated roller during application. Heat-sensitive adhesive between the non-perforated seal liner and the poly-coated release liner is responsive to the low-temperature heated roller, e.g., a temperature of approximately 170–240° F. such that the heat-sensitive adhesive on the seal liner will become tacky or sticky in that temperature range, binds to the plastic-coated side of the poly-coated liner and then, when cooled to room temperature immediately thereafter, becomes dry and non-tacky. At this stage of the fabrication process, the sub-laminate is no longer perforated between opposite sides because of the application of the non-perforated seal liner to one side of the sub-laminate. It will also be appreciated that the nature of the seal liner adhesive is such that it can be removed by hand or machine from the poly-coated liner because the first liner has been poly-coated on the side receiving the heat-activated adhesive of the seal liner.

Following application of the seal liner to the sub-laminate and prior to printing on the image side of the panel using, for example, ink-jet water-soluble inks, the opposite side of the sub-laminate is preferably provided with a spray or mist coating of ink receptor, e.g., a diluted ink-jet emulsion receptor coating where ink-jet printing is contemplated. This spray coating recoats and repairs any damage caused the sub-laminate due to the formation of the perforations and adds a coating through the perforations to portions of the non-perforated seal liner in registration with the perforations. Additionally, the spray or mist receptor coating has chemical drying agents and absorption qualities which enable the receptor coating to dry subsequently applied ink when the substrate is printed and, importantly, to dry or otherwise avoid puddling of the ink in the perforations. Alternatively, the non-perforated seal liner may have within its adhesive characteristics similar drying agents to absorb and dry the inks deposited thereon, thereby eliminating the spray or mist coating process steps. Any puddling or non-drying of the ink in the perforations is a cause for potential ink splattering, and print contamination on the substrate, as well as on the printer and also during handling immediately after printing or upon re-rolling on take-up rewinders. The non-perforated seal liner prevents the ink from passing through the perforations, which would otherwise cause ink contamination of the ink-jet printer itself, causing further contamination of the print.

At this stage and prior to printing, an intermediate product has been formed. The intermediate product would typically be sold by a fabricator to a printer. The printer applies the image to the image side of the panel, subsequently removes the seal liner and then applies the protective laminate. The printer then solders or otherwise connects a power source to the two electrical bus strips of the EL sheetstock. The product is then ready to be sold to and applied by the end user.

After the printer prints an image on the receptor coated side of the sub-laminate, it is important that the seal liner be removed from the back side of the sub-laminate prior to applying a protective non-perforated, optically clear pressure-sensitive over-laminate, i.e., a protectant over-laminate, to the image side of the panel. The protectant over-laminate is used to prevent water or dirt from getting into the perforation holes during use. Thus, after printing and prior to applying the protectant over-laminate, the printer will remove the seal liner by hand or machine, typically by peeling away the seal liner, and taking away with it any dried ink deposited on the seal liner through the perforations. This is significant because the protectant over-laminate, when applied, has a tacky quality which could dip down during over-lamination into the perforations and pick up the dried inks deposited on the non-perforated seal liner. This would render outward visibility from the non-image side of the control panel unacceptable due to blurred vision caused by the dried ink deposits stuck on the protectant over-laminate in the areas of the perforations. Alternatively, the non-perforated seal may have within its adhesive characteristics similar drying agents therein to absorb and dry the inks deposited therein, which would hold onto the excess inks and prevent them from transferring to the sticky protective over-laminate. Another purpose of the seal liner is to prevent moist ink from passing through the perforations and contaminating the surface of the perforated first or poly-coated liner which would otherwise cause contamination of the lower roller of the laminator during application of the protectant over-laminate. Once the protectant over-laminate is applied, the vision panel is ready for use by the end user.

To apply the vision control panel to a window, the end user removes the first poly-coated release liner, leaving the pressure-sensitive adhesive on the back side of the EL sheetstock. This substrate may then be applied, e.g., directly to a window, the image side of the panel being protected by the protectant over-laminate. When viewed from the image side, the viewer will see the image formed by the ink applied to the sheetstock brightly illuminated upon activation, i.e., energization of the EL sheetstock. A viewer on the opposite side of the panel will be able to see through the panel, i.e., through the perforations, without seeing the image or brightly lit halos of light, with only marginal reduction in visibility. This invention therefore overcomes the problem of non-self-illuminated perforated graphics disappearing from view when the light on the non-image side, i.e., inside an office, store or vehicle is greater than the light on the image side. It is also an improvement over retroreflective perforated vision control panels in that the viewer does not have to be located within the path of a light source to see the retroreflective image.

In a further preferred embodiment of the present invention, a white translucent ink-jet-printable film with an ink-jet receptor layer is laminated to the EL sheetstock on the image side of the panel. The translucent film preferably has an overlay of a removable top liner. Depending on whether the panel is for securement along the non-image side of the panel to a transparent surface such as a window, a release liner and pressure-sensitive adhesive may be applied to the non-image side of the panel, i.e., the non-image side of the EL sheetstock. The floodcoat is applied to the non-image side of the sheetstock as in the prior embodiment. The sub-laminate comprising the floodcoat layer, the EL sheetstock with translucent ink-jet receptor liner and a removable top liner overlying the translucent ink-jet receptor layer and with or without the release liner on the non-image side and its associated pressure-sensitive adhesive is then perforated as in the prior embodiment. Subsequent to perforation, the margins of the perforations and non-image side of the EL sheetstock are floodcoated with an opaque material, such as vinyl paint, by the spray nozzles as, and for the reasons previously discussed. A non-perforated low-tac removable liner, such as the seal liner of the prior embodiment, is applied to the floodcoat. The liner may have ink-drying agents on it to absorb and dry excess inks and hold them to the liner preventing the excess inks from transferring to a later-applied optically clear overlaminate, if used.

At this stage, and prior to printing, an intermediate product has been produced which would be typically sold by a fabricator to a printer. When the printer receives the intermediate product of this embodiment, the top liner is removed and the surface of the translucent layer with ink-jet receptor thereon may be printed or otherwise imaged. Once printed, the seal liner, i.e., lower tac liner, is removed, and an optically clear finishing overlaminate may be applied to the image side or to both sides if the release liner with pressure-sensitive adhesive is not applied to the non-image side. Where the release liner is not used and a protectant laminate is applied to both sides, the panel may be encapsulated within a mounted window frame rather than being adhered to a transparent surface such as a window. With the release liner and pressure-sensitive adhesive applied, however, the release liner may be removed and the panel applied to the transparent surface. Before or after applying the panel to a transparent surface or encapsulating it or otherwise mounting the panel, an electrical power source is secured to the bus strips, for example, a power source from a car battery. It will be appreciated that the power source may apply alternating current or may be programmed to provide current or not such that the EL sheetstock may flash, blink, strobe, dim up or dim down as desired, including by random programming, to attract attention. It may also incorporate a timer or electric eye to turn on the EL sheetstock during darkness to prolong the life of the EL sheetstock. See U.S. Pat. No. 5,618,100. (EL sheetstock, if both illuminated and exposed to UV light, will have a shortened life). Thus, both embodiments provide an extremely thin, self-illuminated vision control panel so that the image can be seen from the image side of the panel and the panel can be seen through, i.e., through the perforations from the non-image side. Note that the self-illuminating feature of the present invention prevents the image on the image side of the panel from disappearing from view when the light on the non-image side is greater than the light on the image side.

In a preferred embodiment according to the present invention, there is provided a vision control panel comprising a substrate of electrically energized light-emitting sheetstock having terminals for connection to an electrical power source, a plurality of perforations through the substrate, a substantially non-light-transmitting material on the interior circumferential margins of the perforations for substantially precluding transmission of light from the sheetstock into the perforations when the sheetstock is electrically energized and emits light and translucent materials overlying one side of the substrate forming an image thereon viewable as an illuminated image from one side of the panel upon energization of the electrically energized light-emitting sheetstock.

In a further preferred embodiment according to the present invention, there is provided a vision control panel comprising a substrate of luminescent sheetstock, a plurality of perforations through the substrate, a substantially non-light-transmitting material on the interior circumferential margins of the perforations for substantially precluding transmission of light emitted from the luminescent sheetstock into the perforations and translucent materials overlying on one side of the substrate for forming an image and viewable as an illuminated image from one side of the panel upon emission of light from the luminescent sheetstock.

In a still further preferred embodiment according to the present invention, there is provided a vision control panel comprising sheetstock including a pair of transparent electrode layers separated one from the other by a layer of electrically energized light-emitting material arranged in a grid pattern defining light-emitting portions and non-light-emitting portions when electrically energized, a layer of dark opaque material overlying one of the transparent electrode layers arranged in a grid pattern in registration with the grid pattern of the electrically energized light-emitting material and having transparent areas in registration with the non-light-emitting portions of the electrically energized light-emitting material and a layer of translucent material overlying another of the transparent electrode layers forming an image thereon and arranged in a grid pattern in registration with the grid patterns of the electrically energized light-emitting material and the dark opaque material, the translucent image-forming material having transparent areas in registration with the non-light-emitting portions of the electrically energized light-emitting material and the transparent layer of the dark opaque material, whereby an observer on the imaged side of the panel sees an illuminated image upon electrical energization of the light-emitting material and an observer on an opposite side of the panel sees through the panel but without seeing the image.

In a still further preferred embodiment according to the present invention, there is provided a vision control panel comprising sheetstock including a pair of transparent electrode layers separated one from the other by a layer of electrically energized light-emitting material arranged in a grid pattern defining light-emitting portions and non-light-emitting portions when electrically energized, a layer of translucent material overlying each of the transparent electrode layers forming first and second images on respective opposite sides of the panel and arranged in a grid pattern in registration with the grid pattern of the electrically energized light-emitting material, each of the translucent image-forming materials having transparent areas in registration with the non-light-emitting portions of the electrically energized light-emitting material, whereby an observer on one imaged side of the panel sees an illuminated image and an observer on an opposite image side of the panel sees an illuminated second image.

In a still further preferred embodiment according to the present invention, there is provided a vision control panel comprising sheetstock including a pair of transparent electrode layers separated one from the other by a layer of electrically energized light-emitting material arranged in a grid pattern defining light-emitting portions and non-light-emitting portions when electrically energized, an optical clear layer of sheet material removably adhered to the sheetstock on one side of the sheetstock, a layer of translucent material overlying one optically clear layer forming a first image on one side of the panel and arranged in a grid pattern in registration with the grid pattern of the electrically energized light-emitting material, the layer of translucent image-forming materials having transparent areas in registration with the non-light-emitting portions of the electrically energized light-emitting material, whereby an observer on the imaged side of the panel sees an illuminated image and an observer on an opposite side of the panel sees through the panel.

In a still further preferred embodiment according to the present invention, there is provided a method of fabricating an illuminated vision control panel comprising the steps of (a) providing a substrate of electroluminescent sheetstock having terminals for connection to an electrical power source, (b) perforating the substrate forming a plurality of perforations therethrough, (c) applying an opaque coating overlying one side of the substrate and along interior margins of the perforations and (d) overlying translucent material on at least an opposite side of the substrate for forming an image thereon thereby enabling the image to be seen from an imaged side of the panel upon energization of the electroluminescent sheetstock.

Accordingly, it is a primary object of the present invention to provide a novel and improved self-illuminating thin-sheet printable perforated or non-perforated vision control panel and methods of fabricating the panel. Problems associated with the fabrication of a vision control panel, including smearing or blurring of ink on various layers of the panel during fabrication and blurred vision through the perforations caused by ink particles in the perforations in the final perforated product, and lighting and visibility problems associated with reflective and retroreflective perforated graphics, such as the disappearance of the image if the light is greater on the non-imaged side or if the viewer is not within a light source path (i.e., headlights) are overcome in both the present perforated and non-perforated vision control panel.

BRIEF DESCRIPTION OF THE DRAWINGS

FIG. 3 is a cross-sectional view of the completed vision control panel as applied to a transparent window;

FIG. 4 is a schematic illustration of an ink receptor coating and/or a dark opaque color spray or misting machine for use in fabricating the control panel of the present invention;

BEST MODE FOR CARRYING OUT THE INVENTION

Figure 1:
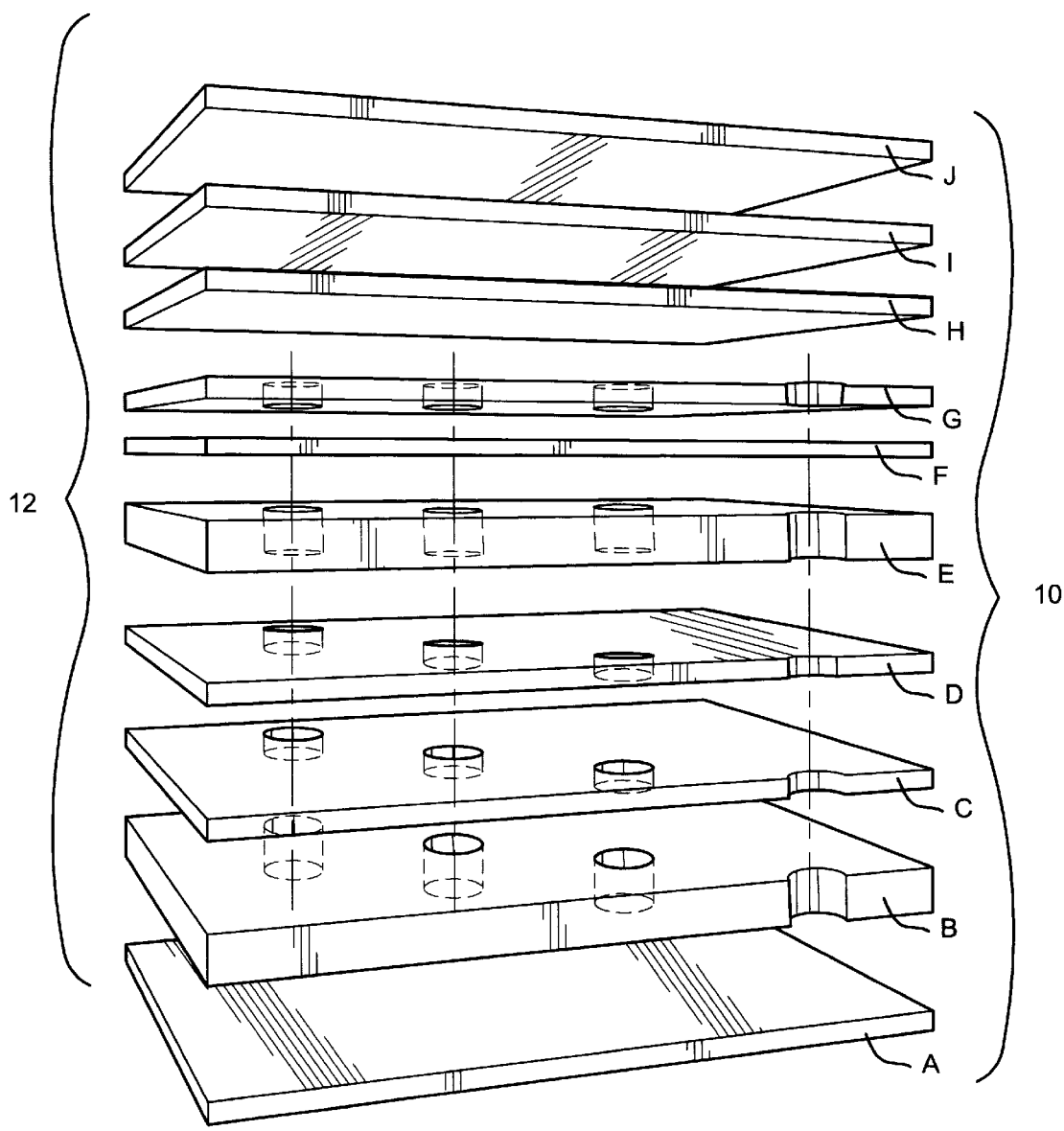
FIG. 1 is an exploded perspective view illustrating various layers of different materials used in the fabrication of a vision control panel according to the present invention.

Referring now to FIG. 1, there is illustrated various layers used in the fabrication process to form a self-illuminating vision control panel according to the present invention. The various layers are designated A through J. A vision control panel 10 as supplied to an end user of the panel is comprised of layers B through J, whereas an intermediate product 12 used in the fabrication of the control panel 10 comprises layers A through H. As will become clear, certain layers are omitted depending on the nature of the substrate and whether water-soluble or solvent or vinyl-based inks are employed. In order from bottom to top, the various layers formed in the fabrication process when water-soluble inks are used are as follows:

A—A non-perforated over-laminate or seal liner with heat-activated adhesive

B—A poly-coated release liner

C—An optically clear pressure-sensitive adhesive

D—A dark-colored floodcoat

E—Electroluminescent sheetstock

F—A primer coat

G—A first ink receptor coating

H—A second ink receptor coating

I—An ink layer forming the image on the control panel

J—A protectant over-laminate with optically clear pressure-sensitive adhesive

To form a self-illuminating vision control panel using solvent or vinyl-based inks, electrostatic transfer, thermal transfer (i.e., Gerber edge), silkscreen, Idanit printing method or other imaging methods applied to EL sheetstock of a vinyl composition, layer F is not required. When the EL sheetstock has a composition other than vinyl, layer F may be required. Where the panel substrate is vinyl and water-soluble inks and certain solvent-based inks are used, all of the above layers are required.

Referring more particularly to the various layers, layer A comprises a non-perforated seal liner which employs a heat-activated adhesive for securement to the underside of the poly-coated release liner B. Layer A may be purchased commercially under brand names, such as Seal and GBC Pro-Tech and may have within its adhesive a chemical drying agent to absorb and dry excess ink deposits thereon which will hold the excess inks from transferring to the sticky protective overlaminate. As noted below, layer A is laminated to layer B after perforations 26 are provided layers B–G and before the ink receptor spray coating H. Layer B is a poly-coated release liner, preferably paper, which is releasably secured to layer D by an optically clear pressure-sensitive adhesive layer C. The poly-coat layer B has a plastic material coating on its side adjacent layer A and a silicone release coating on its opposite side. The dark-colored floodcoat of layer D, which is preferably dark gray or less preferably, black, is suitably adhered to the non-image side of electroluminescent sheetstock layer E. In lieu of layers C and D, a dark-colored pigmented adhesive may be used to releasably secure the poly-coated paper liner of layer B to the EL sheetstock of layer E. The primer coat F may be an acrylic or vinyl binder and may be applied to the image side of layer E by conventional roller coating or spray coating equipment. If a surface layer of the EL sheetstock is vinyl, primer coat F may be omitted. EL material of layer E may comprise electroluminescent or other self-illuminating particles which are suitably adhered to each other as a composite sheetstock of layer E. On top of layer E or F, as applicable, and for use with water-soluble inks, is a first ink receptor coating G, preferably an ink-jet emulsion receptor coating where ink-jet printing is used to form the image on the resulting control panel. This receptor coating comprises well-known material and may be provided by similar roller coating or spray coating equipment as used to apply the primer coating F. A second ink receptor coating H comprises the same material as the receptor coating of layer G, preferably in diluted form. The manner of application of coating H is by spraying or misting over the receptor coating G after perforations have been provided through layers B–G and layer A has been applied as described hereinafter. Layer I is the ink which is spray-printed, for example, during ink-jet printing, onto the ink receptor coating H to form the image on the panel. Ink layer I is preferably a water-soluble ink. Where layer I is a solvent or vinyl-based ink, coatings of layers F, G and H may not be necessary and if the EL sheetstock has a vinyl surface on the image side, layer F may also not be necessary. Layer J is an optically clear protectant non-perforated over-laminate applied using pressure-sensitive adhesive and may be formed from vinyl fluoropolymers or polyester sheet material. The material of layer J is commercially sold under brand names from 3M 89-14, Avery DOL 4100 Perforated Window Film Overlaminate, DuPont Teflon Graphics overlay or MacTac IP-7000. This protective layer is applied after removal of the seal liner A as described below. Seal liner A may not need to be removed prior to adding seal liner A if it has within its chemical characteristics a drying and absorbing agent to prevent excess ink from transferring to the protective overlaminate.

Figure 1A:
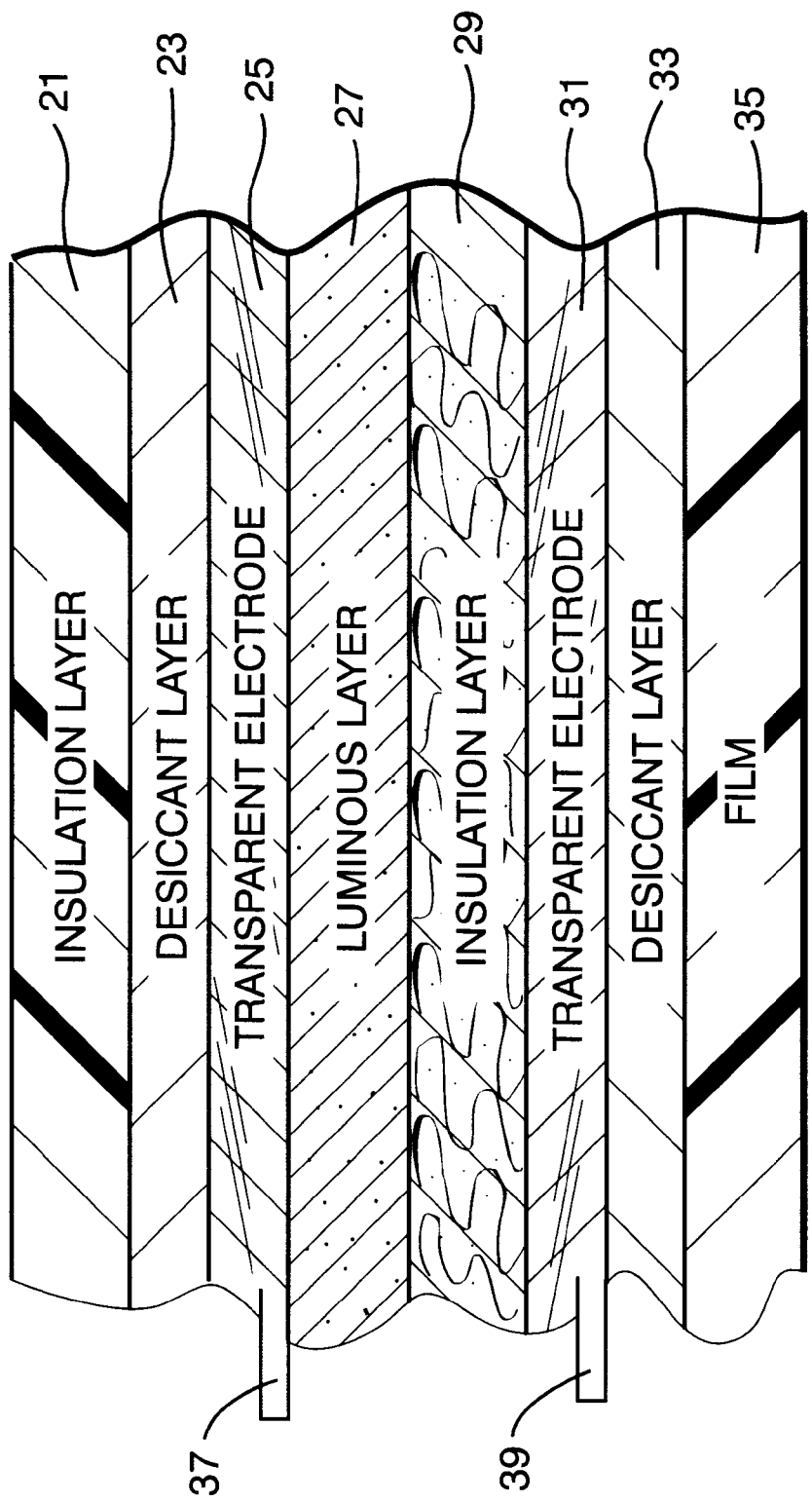
FIG. 1A is a fragmentary cross-sectional view illustrating the layer E of FIG. 1.

Referring now to FIG. 1A, the EL sheetstock of layer E is commercially available and comprises a film layer 21, a dessicant layer 23, a transparent electrode 25, a luminous layer 27, preferably formed of phosphorus materials, an insulation layer 29, a second transparent electrode 31 (which need not be transparent if the illuminated image is to appear from only one side of the panel), a desiccant layer 33 and a film 35. The transparent electrode layers 25 and 31 include bus bars 37 and 39 to which electrical connections can be made. It will be appreciated that the sheetstock is very thin and may range from 0.3 mm up to and exceeding 2 mm. The sheetstock is also lightweight, e.g., on the order of 0.15 g/cm$^2$ or heavier and is a highly flexible material.

Figure 2:
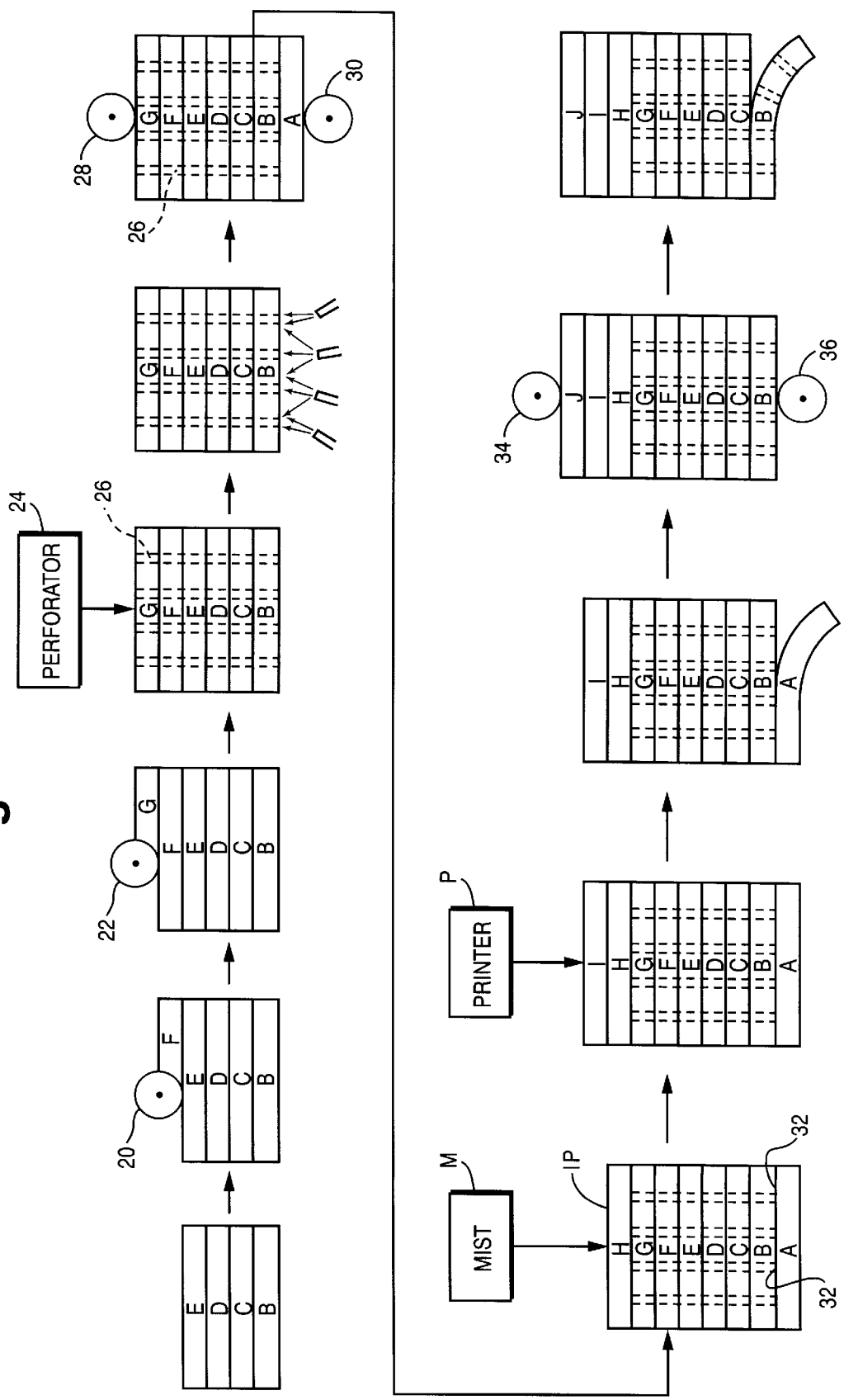
FIG. 2 is a schematic illustration of the various steps of forming the vision control panel illustrated in FIG. 3.
Figure 5A:
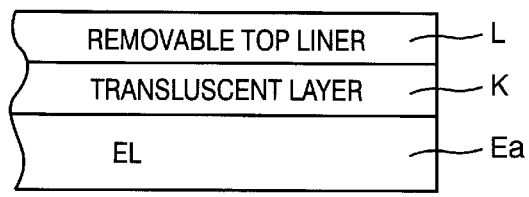
FIGS. 5A–5F are schematic illustrations of various steps of forming a vision control panel in accordance with a further embodiment of the present invention.
Figure 5B:
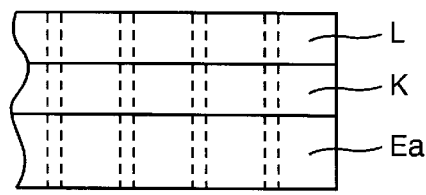
Figure 5E:
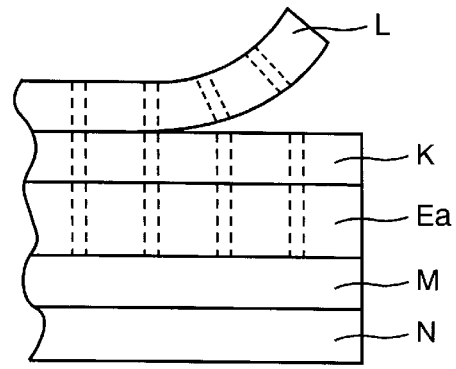
Figure 5C:
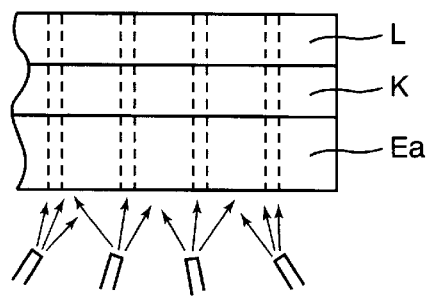
Figure 5F:
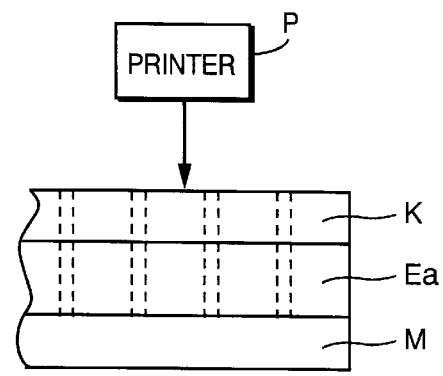
Figure 5D:
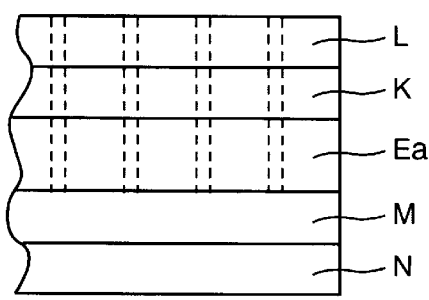

Referring now to FIG. 2, the method of fabricating the final vision control panel is schematically illustrated. The layers B, C, D and E are commercially available from suitable suppliers. The primer coat of layer F may be applied to the non-perforated layers B, C, D and E by a conventional roller coating process schematically illustrated at 20. Next, the layer G, which is the first ink receptor coating, may be applied to the EL sheetstock of layer E by a conventional roller coating or spray coating process schematically illustrated at 22. For example, an acrylic or clear vinyl binder primer may be applied, particularly when layer E comprises vinyl white-colored translucent sheetstock. This sub-laminate is now ready for perforation.

Many different types of perforators may be used to perforate the sub-laminate, one of which is schematically illustrated at 24. For example, rotary die, step and repeat mechanical dies or laser perforators may be used. Where the EL sheetstock is of a thicker or harder to perforate nature, laser perforations are preferred in accordance with my U.S. Pat. No. 5,550,346. The perforations 26 are preferably circular holes, although other geometrical configurations may be provided. Preferably, the circular holes have a hole diameter within a range of 0.03 to 0.25 inches and the distribution of the perforations is such that preferably 10–68% of the panel comprises open areas defined by the holes. A typical vision control panel may therefore have a hole diameter of 0.05" with 114–260 holes per square inch, providing an open area of 22–50%.

Importantly, following perforating the sub-laminate, the margins about the perforations in each of the layers B–G are coated with a dark opaque coating, for example, a vinyl paint. That is, the inside perimeters of the perforations are coated. This can be accomplished by spray-coating one side, for example, on the side of the release liner B, using a plurality of nozzles N at different angles or orientation as the sub-laminate is passed through a coating chamber. The spray nozzles may also apply a coating to the sub-laminate perforations from the opposite side, i.e., on ink receptor coating G. As indicated previously, it is important that the margins for a full 360° about each of the perforations through the layers and particularly the perforated EL sheetstock have a dark coating to preclude in use the illumination from the EL sheetstock of layer E from shining toward the non-image side and/or the image side of the panel through the edges of the perforations. Without the opaque coating, rings or halos of illumination will be become evident upon viewing the panel, degrading the image on the image side, as well as the capability of seeing through the panel from the non-image side.

The perforated sub-laminate is then passed through a roller laminator comprised of a pair of rolls 28 and 30, only one of which is heated. The non-heated roller 28 overlies the layer G, while the heated roller 22 overlies the seal liner layer A. Preferably, a 1 or 2 mil non-perforated seal liner layer A with a heat-activated adhesive thereon which may or may not have ink-drying agents is laminated to the surface of the poly-coated release liner layer B at a low adhesive activation temperature of about 170–240° F. The seal liner A should be as thin as possible in order that the overall thickness of the laminate prior to printing remains as thin as possible. This precludes the formation of a relatively stiff laminate which is to be avoided to eliminate problems associated with passing the laminate underneath a printer's flying printing head. By applying heat only to one roller, heat damage to the coating on the ink receptor coated side of the construction is prevented or minimized. It will be appreciated that the adhesive used to apply the seal liner A to the poly-coated paper is such that the adhesive becomes tacky in the above temperature range and binds to the poly-coated paper of layer B and then, when cooled to room temperature, becomes dry and non-tacky. If pressure-sensitive adhesive is used on seal liner A, the surface portions of liner A in registration with the perforations would be tacky and the ink-jet receptor coating H would not properly bind to it, unless same had special ink-jet emulsions that would dry the adhesive upon application of wet inks.

It will be appreciated from a review of FIG. 2 that at this stage in the fabrication process, the perforations 26 through the sub-laminate do not extend through from one side to the other because of the addition of the non-perforated seal liner of layer A. As the next step, an additional ink receptor layer H is applied to overlie the first ink receptor coating of layer G. This second ink receptor coating of layer H is preferably, but need not be, the same composition as the first ink receptor coating of layer G but in diluted form to permit spraying or misting onto the first ink receptor coating by a machine M illustrated in FIG. 4, described hereinafter. Consequently, this second coating is a dilution with water of the same composition as the first ink receptor coating, e.g., a dilution in a range of 3:1 to 20:1. Thus, the second or final ink receptor coating is not applied by conventional commercial roller coating equipment but, rather, by a mist or spray machine custom-designed as set forth below which sprays or lightly mists the second ink receptor coating onto the first ink receptor coating.

It will be appreciated that the second ink receptor coating of layer H during the application process is beneficially and advantageously applied in the perforations such that the second receptor coating is applied to portions 32 of the seal liner of layer A which lie in registration with the perforations 26. The purpose of the second ink receptor coating of layer H is twofold: (1) to recoat and repair any damage caused to the first ink receptor coating of layer G due to the perforating process which could cause a halo effect surrounding the perforations upon printing and (2) to add a coating to the portions 32 of the seal layer A in registry with the perforations 26. The repair of the first ink receptor coating of layer G affords a better quality print as the second mist or spray ink receptor coating of layer H fills any small hairline cracks or damage to the surface of the first ink receptor coating of layer G caused by the perforations 26, which might otherwise cause a halo effect about the perforations. Also, during subsequent printing, the chemical drying agents and absorption qualities of the second ink receptor coating enables the ink from the printing process to dry quickly, particularly on the registering surface portions 32. Puddling of the ink in the perforations 26 is also avoided. Non-drying or puddling of the ink in the perforations 26 causes a potential for ink to splatter, as well as print contamination due to wet ink during handling immediately after printing or upon re-rolling on an ink-jet printer take-up winder. One of the beneficial aspects of providing a seal liner, i.e., layer A, during printing is that the ink is prevented from passing through the perforations 26, which would otherwise cause ink contamination of the printer, contamination of the bottom layer of the printable substrate and, consequently, the lower roller of the laminator during finishing over-lamination and cause further contamination of the print.

It is important that the applied ink receptor coating penetrate the perforations onto the seal liner layer A for the purposes previously discussed, e.g., to prevent ink residue from residing in the perforations and on the tacky pressure-sensitive protectant over-laminate of layer J, which would then blur the image and visibility through the final control panel. An alternative is to have the seal laminate contain within its chemistry the ink-jet ink-drying agents to hold the inks from transferring to the finishing over-laminates.

At this stage of fabrication, the intermediate product 12 is ready for printing, over-laminating and soldering or otherwise connecting the two electrical bus strips 37, 39 to a power source for use by the end user. Consequently, the fabricator may rewind the sub-laminate and ship the rewound intermediate product to a printer, for example, a commercial ink-jet printing establishment. With the seal liner of layer A intact and underlying the perforation holes 26, the opposite exposed surface area of the intermediate product 12 may receive the ink of layer I. The second receptor coating of layer H enables the inks forming the printed image to dry quickly without puddling or splattering. After printing by printer P, and before the addition of the final protectant over-laminate layer J, the seal layer A may be removed from the poly-coated paper layer B, e.g., by hand or machine. As the seal liner is being removed, the liner takes with it the dried ink deposited through the perforations 26 during the printing process onto portions 32. The removal of layer A is important if a seal liner with drying agents therein are not used. If left in place and the protectant over-laminate J is applied to the opposite side, the tacky quality of the pressure-sensitive non-perforated protectant over-laminate J could dip down during machine or hand over-lamination into the perforations 26 and have adhered thereto the dried inks deposited on the seal layer A. As will be recalled, the protectant over-laminate is an optically clear non-perforated, preferably plastic material having pressure-sensitive adhesive for adhering it to the sub-laminate. If the dried inks or other materials adhere to the adhesive of the over-laminate of layer J, vision through the panel from the non-image side, i.e., through the perforations, would be inhibited and obscured. Additionally, the application and subsequent removal of the non-perforated seal liner of layer A prevents moist ink from contaminating the surface of the poly-coated liner which could cause contamination of the lower roller of the laminator during application of the protectant over-laminate by rollers 34 and 36. Consequently, the seal liner A is removed after printing and before the over-laminate of layer J is applied to the control panel.

At this stage, and with the protectant over-laminate of layer J applied, the control panel is complete and ready for use by an end user. Turning to FIGS. 2 and 3, the end user applies the vision control panel to a transparent substrate such as a window W by removing the poly-coated layer B (FIG. 2). The pressure-sensitive adhesive between the poly-coated layer B and the EL sheetstock of layer E remains with the panel and enables the panel to be adhered to the outside of a transparent window W. Electrical connections are also made to the bus strips 37, 39. Consequently, an individual viewing the panel from the outside of the window, as viewed from right to left in FIG. 3, will see the illuminated image on the panel, particularly during evening hours, whereas a viewer viewing the panel from the inside of the window, from left to right in FIG. 3, will see through the panel, i.e., see through the perforations, without seeing the illuminated image.

As indicated previously, where solvent or vinyl-based inks are used, layers F, G and H are omitted, provided the EL sheetstock contains a vinyl facing on the image side. Layers F, G and H, of course, are applied in conjunction with the other applicable layers, where a vinyl substrate layer E is used and water-soluble or hybrid solvent-based ink-jet printing is contemplated.

Referring now to FIG. 4, there is illustrated an applicator for the mist or spray ink receptor coating and/or dark opaque vinyl spray paint of layers H and D, respectively. As illustrated, a roll of the various materials for forming the intermediate product 12, i.e., layers B through G, is provided. A web of the material is passed through a closed chamber 38 defined by a hood 40 connected to a suction blower 42 and overlying an over-spray catch pan 46. A spray nozzle 48 is provided for spraying the second ink receptor coating of layer H and/or dark opaque vinyl spray paint of layer D from a supply 50 thereof onto the first receptor coating layer G and/or non-image side of the EL sheetstock layer E. Excess spray or mist is returned to the supply 50 via line 52. The web is then passed through a curing tunnel 52 in which are disposed a plurality of longitudinally spaced heat elements 54. Additionally, a forced air blower 56 is provided for supplying air heated by heater 58 between the spaced elements 54 into the tunnel to cure the receptor coating and/or dark opaque floodcoating. Once cured, the web is taken up on a rewinder 60 and provided to the printer in roll form.

It will be appreciated that the panel may be applied to the inside of a window. To accomplish this, the protective overlaminate J is replaced by a double-sided clear transfer adhesive film. Layers B and C are also not required. Instead, when layer A is removed after printing, a protective overlaminate, similar to layer J, is applied to layer D to prevent dust, etc. from getting into the holes. This enables the panel to be cleaned, e.g., by spraying and wiping with a cleaner to remove stains, grime, etc.

Referring now to FIG. 5, wherein like reference are applied to like parts, followed by the suffix "a," an EL sheetstock $E_a$ is provided with a translucent ink-jet receptive layer K having a removal top liner L. As illustrated in FIG. 5B, the layer Ea, K and L are perforated, employing the perforators previously discussed. Next, as illustrated in FIG. 5C, the perforated layers Ea, K and L are floodcoated on the non-image side of sheetstock Ea with a dark opaque material such as vinyl paint. As in the prior embodiment, it is important that the margins of the perforations are coated with the dark opaque material such that light may be blocked from being transmitted from the perimeter of each perforation. The top liner L protects the translucent layer K from the opaque coating applied within the perforations and hence preserves the top surface of layer K for subsequent printing In FIG. 5D, a non-perforated, low-tac removable liner N is applied to the non-image side of the sheetstock Ea, overlying the opaque flooded coated surface using a low-tac adhesive M having ink-jet drying agents on it to absorb and dry excess inks and hold them to the liner, preventing the excess inks from transferring to an optically clear overlaminate, if used. The low-tac liner N serves the same purpose as the seal liner A of the prior embodiment. As an option, prior to adding the non-perforated low-tac removable liner N to the floodcoated surface, a clear spray adhesive may be added to the floodcoated surface with the non-perforated low-tac liner N later added. This facilitates mounting of the panel to a clear surface such as glass. In FIG. 5E, the tear-away top liner L is removed from the ink-jet printable surface and an ink-jet printer may apply an image to the surface of the ink-jet receptive translucent layer K. After printing, an optically clear finishing overlaminate may be applied to the printed or image side of the panel. The panel may then be applied to a transparent surface, for example, a window or glass divider wall, by removing liner N and by adhering the sheetstock layer along the floodcoated side of the panel with the clear adhesive M to the transparent window. Alternatively, if the panel is to be encapsulated, i.e., located in a frame and not adhered to a surface, the protective overlaminate may be applied to both sides of the panel.

The panel is now ready for connection to a source of electrical current. For example, the bus strips 37, 39 may be connected to a battery and/or AC/DC converter power supply controller.

It will be appreciated that in both forms of the present invention, the illuminated graphic will not disappear if the light on the non-image side of the panel is greater than the light on the image side of the panel. The self-illumination provided by the electroluminescent sheetstock enables clear viewing of the image side of the panel, for example, from the outside of an office window or transit bus window, when the lights within the office or bus on the non-image side are burning brightly. Additionally, notwithstanding the illumination, a viewer on the non-image side can clearly see through the panel with very little diminution caused by the panel construction.

Alternatively, the EL sheetstock can be fabricated with perforations therein with black floodcoating on the reverse side thereof and on the inside edges of the perforations with ink-jet receptor or other receptor material on the image side of the perforated sheetstock. This will eliminate the need for perforating the sheetstock by a fabricator. The fabricator or printer need only apply the liner N. The EL sheetstock may also be fabricated to illuminate on both sides, enabling different images to be displayed simultaneously on either side, yet still offering see-through capabilities through the dark image portions of the image.

It will also be appreciated that instead of employing an electroluminescent material EL, a luminescent material may be utilized. Luminescent material differs from the electroluminescent material in that the luminescent material does not require an electrical connection. Characteristic of the luminescent material is that after it is exposed to light energy, i.e., sunlight, fluorescent lamps or the like, visible light continues to be emitted for a substantial period of time without any excitation light sources. An example of such material is Ultra Glow™ Luminescent Sheetstock manufactured by Nichia Chemical Industries, Ltd.

Figure 6:
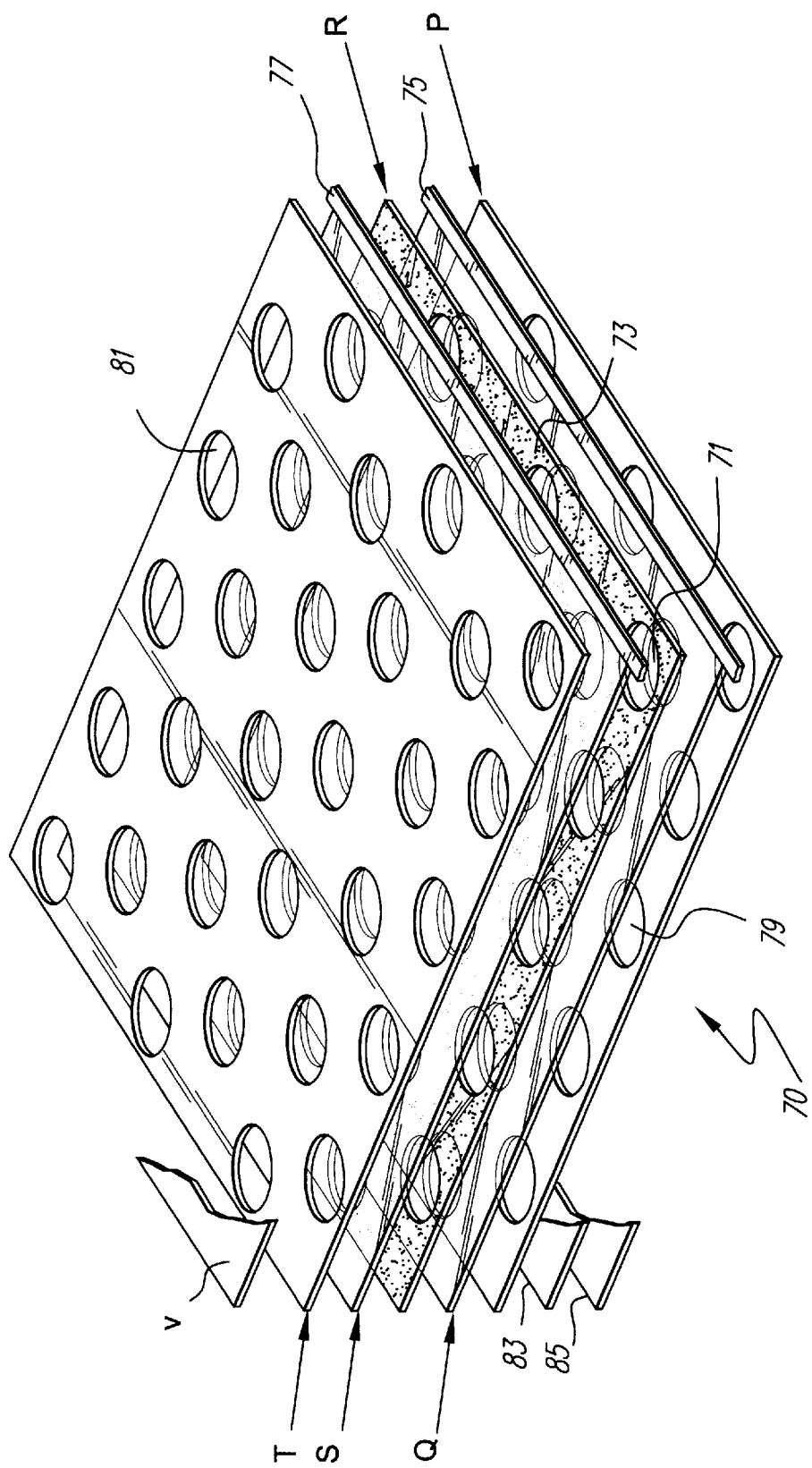
FIG. 6 is a perspective view of a vision control panel according to a further embodiment of the present invention.

Referring now to FIG. 6, there is illustrated a vision control panel, generally designated 70, constructed in accordance with a further embodiment of the present invention. Panel 70 includes a layered panel comprised from bottom to top of a dark opaque colored layer P. Layer P may be formed of ink, paint or other materials of a dark opaque color which can be printed or otherwise applied to the superposed layer. The superposed layer Q is one of two transparent electrode layers Q and S each comprised of a thin, transparent film, preferably with sputtered Indium-Tin Oxide deposited thereon and having an intervening layer R formed of electrically energized light-emitting material such as phosphor inks or other light-emitting electrically charged particles preferably silkscreened onto one of the layers Q or S. The next layer T comprises a translucent material applied to the transparent electrode layer S to form an image. For example, the translucent material may comprise translucent inks or toners or other imaging materials normally silkscreened onto a substrate.

It will be appreciated that the electrically energized light-emitting material R is provided in a grid pattern defining transparent non-light-emitting portions 71 which comprise areas of the light-emitting material not printed or otherwise applied, for example, by silkscreening, onto the transparent electrodes Q or S. The remaining portion 73 of the grid pattern of layer R forms a light-emitting portion when electrically energized. Each of the transparent electrodes Q and S have electrically conductive bus strips, 75 and 77, respectively, normally printed or otherwise applied thereto, to which a solder connection can be made to attach an electrical power source. This may be accomplished by removing a small section from the underlying layer P to expose the bus strips for solder connection from and through layer P.

From a review of the drawing figure, it will be appreciated that the grid patterns of layers P, R and T lie in exact registration one with the other. That is, the non-light-emitting portions 71 of layer R lie in exact registration with the non-printed areas 79 and 81 of layers P and T, respectively. Consequently, when electrical energy is applied to the transparent electrodes of layers Q and S, the light-emitting layer R is energized to transmit light through the translucent image-forming material of layer T whereby the image formed by layer T can be viewed from one side of the vision panel. The light emitted from layer R toward the opposite side of the panel, however, is blocked by the dark opaque color of layer P. Consequently, an observer on the opposite side of the panel from the image side does not see the image but sees through the panel and particularly through the registering non-light-emitting portions 71 of the electrically energized light material of layer R and the non-printed areas 79 and 81 of layers P and T, respectively. It will also be appreciated that an optical clear coating V, for example, formed of a plastic material, may optionally overlie the layer of translucent material T to protect the panel from the environment. A similar layer may be applied to the opposite side of the panel where the panel is used in a frame or exposed to the environment on both sides. A clear adhesive 83 with overlying release paper 85 may be applied along the non-image side of the panel, i.e., to layer P, in order to adhere the panel to a surface, for example, a transparent window surface, with the release paper, of course, being removed upon application of the panel to the window surface. As a further alternative, and instead of imaging the transparent electrode, an overlying protective laminate may be releasably secured to the transparent electrode by a clear removable adhesive. The laminate may then be imaged similarly as layer T and similarly registered with the other layers of the panel. In this manner, the protective laminate with the image can be removed from the panel and replaced with another protective laminate which can then be imaged similarly as the original protective laminate.

It will be appreciated that the grid patterns may include horizontal lines, printed dots or any other type of pattern whereby the image can be viewed from one side and the panel seen through from the opposite side. Thus, in the preferred illustrated embodiment, the non-printed areas 79 and 81 of layers P and T and the non-light-emitting portions 71 of layer R are illustrated as circular configurations (which may correspond in size to the previously disclosed perforations). Alternatively, the non-light-emitting portions of the electrically energized light-emitting material layer R may comprise areas surrounding dots or areas on opposite sides of horizontal lines in registration with similarly formed grid patterns of layers P and T where the dots or lines are comprised of the translucent materials on layer T and form the image and the dark opaque color of layer T is printed or otherwise applied to the dots or lines, blocking emission of light to the non-image side of the panel. In that form, the image is formed by the dots or lines and is visible on the image side of the panel while an observer on the opposite side of the panel sees through the panel areas surrounding the dots or lines.

Importantly, alleviate the problem of light being transmitted from the light-emitting portions of the electrically energized light-emitting material or layer R into the non-light-emitting portions thereof and forming tiny rings of illumination or illuminated halos about each such portion, the diameter of the non-printed areas of layers P and T can be sized slightly smaller than the diameter of the non-printed areas of layer R. This will minimize or preclude halos of light-emitting formations about the perimeter of the printed areas of layer R.

It will be appreciated that the layers P, Q, R, S may be mass produced and provided as an intermediate product to a silkscreen printing fabricator, along with a screen mesh and pattern to print layer T in exact registration with layer P. The printing fabricator would then image layer T and provide the electrical connection to the bus strips to provide a vision control panel ready for the end-user. Note that because of the flexibility of these layers in this embodiment, as well as in the prior embodiments, the panel can be rolled up and placed in a tube for convenient low-cost shipping to an end user where the panel would be unrolled and simply applied, for example, by adhesive to a proper location unlike current bulky fluorescent signage which must be installed well above eye level and which requires substantial labor to install, as well as periodic replacement of the bulbs and ballast used for illumination.

In a still further embodiment of the present invention, the panel may have an illuminated image on both sides. To accomplish this, a second layer of translucent material, e.g., corresponding to layer T may be applied to the panel in lieu of the layer P. Thus, two layers of translucent material may be provided on opposite sides of the panel with one layer overlying to a transparent electrode Q and the other layer overlying the second transparent electrode S, the grid patterns in each of the layers of translucent material being identical but defining the same or different images. Consequently, upon electrical energization of the electrodes, brightly illuminated images would be observable from opposite sides of the panel.

Further, where non-translucent opaque inks are applied as part of or overlying or underlying each of the translucent material layers and in discrete areas on the opposite sides of the panel, an observer may see through the panels in those discrete areas. Thus, an observer on one side of the panel may observe a first illuminated image and an adjacent see-through area of the panel. An observer on the opposite side of the panel will observe a second illuminated image and an adjacent see-through area of the panel. Neither the printed images nor the non-printed discrete see-through areas need register with one another on opposite sides of the panel.

As indicated previously, to alleviate the problem of the rings of illumination or illuminated halos resulting from light being transmitted from the light-emitting portions of the electrically energized light-emitting material into the non-light-emitting portions thereof, the diameters or size of the non-printed areas of the pair of translucent material layers on opposite sides of the panel can be sized slightly smaller than the non-printed-areas of the layer R.

Importantly, and with respect to all embodiments of the present invention, the ability to see through the panel from either side is not affected by the environmental illumination on either side. That is, the present invention provides a panel whose image will not disappear or dissipate when the level of illumination on the non-image side of the panel from environmental lighting is equal to or exceeds the level of illumination on the image side. This is accomplished by the self-illumination of the panel provided by the electroluminescent or luminescent layers and the elimination of the bright halo effect of the self-illuminating layers which would otherwise spill out around the perimeter edges of the perforations (FIGS. 1–5) or the non-printed areas (FIG. 6) and which would otherwise significantly impede visibility through the non-imaged side of the vision control panel and create a washed-out appearance of the image and colors on the imaged side of the panel.

It will be appreciated that in the final embodiment of the invention illustrated in FIG. 6, a pattern of layer T in exact registration with the grid patterns of layers P and R may be applied with a stencil pattern with ink-repellent properties by any printing technique. That is, colored inks or marking fluids may be successively applied, with the colored inks or fluid being repelled by the stencil material but remaining on the substrate in-between the stencil material. The stencil material may then be removed by a solvent or heat.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vision control panel comprising:
   a substrate of electrically energizable light-emitting sheetstock having terminals for connection to an electrical power source;
   a plurality of perforations through said sheetstock;
   a substantially non-light-transmitting material on the interior surfaces of said perforations between opposite sides of the sheetstock for substantially precluding transmission of light from said sheetstock through said surfaces into the perforations when said sheetstock is electrically energized and emits light; and
   translucent materials overlying one side of said sheetstock forming an image thereon viewable as an illuminated image from one side of said panel upon energization of said electrically energized light-emitting sheetstock.

2. A panel according to claim 1 including a poly-coated release liner releasably secured to said substrate along an opposite side thereof from said one side of said panel, a plurality of perforations extending through said release liner in registration with the perforations through said sheetstock, a non-perforated second release liner releasably secured to said poly-coated release liner along a side thereof remote from said substrate, thereby registering surface portions of said second release liner with said registering perforations, said translucent materials comprising an ink, and an ink receptor coating overlying said sheetstock for receiving said ink.

3. A panel according to claim 2 including a second ink receptor coating overlying the first mentioned ink receptor coating with portions of said second ink receptor coating coating said registering surface portions of said second release liner through said perforations.

4. A panel according to claim 1 including a substantially dark-colored opaque layer on an opposite side of said sheetstock from said one side thereof for substantially blocking light transmission from said sheetstock through an opposite side of said panel from said image side, said opaque layer having perforations in registration with the perforations through said sheetstock, whereby an observer on said one panel side sees the image and an observer on an opposite side of the panel sees through the panel through said registering perforations without seeing the image.

5. A panel according to claim 4 including a poly-coated release liner releasably secured to said substrate along an opposite side thereof from said one side of said sheetstock, a plurality of perforations extending through said release liner in registration with the perforations through said sheetstock, a non-perforated second release liner releasably secured to said poly-coated release liner along a side thereof remote from said sheetstock, thereby registering surface portions of said second release liner with said perforations, said translucent materials comprising an ink, and an ink receptor coating overlying said substrate for receiving said ink, a pressure-sensitive adhesive between said poly-coated release liner and said substrate and a heat-sensitive adhesive between said non-perforated liner and said poly-coated liner for releasably securing said liners to one another.

6. A panel according to claim 1 including a protective layer of non-perforated substantially optically clear material overlying said translucent materials.

7. A panel according to claim 1 wherein said sheetstock comprises electroluminescent material.

8. A vision control panel comprising:
   a substrate of luminescent sheetstock;
   a plurality of perforations through said sheetstock;
   a substantially non-light-transmitting material on the interior surfaces of said perforations between opposite sides of the sheetstock for substantially precluding transmission of light emitted from said luminescent sheetstock through said surfaces into the perforations; and
   translucent materials overlying one side of said sheetstock for forming an image and viewable as an illuminated image from said one side of said panel upon emission of light from said luminescent sheetstock.

9. A panel according to claim 8 including a poly-coated release liner releasably secured to said sheetstock along an opposite side thereof from said one side of said sheetstock, a plurality of perforations extending through said release liner in registration with the perforations through said sheetstock, a non-perforated second release liner releasably secured to said poly-coated release liner along a side thereof remote from said sheetstock, thereby registering surface portions of said second release liner with said perforations, said translucent materials comprising an ink, and an ink receptor coating overlying said sheetstock for receiving said ink.

10. A panel according to claim 9 including a second ink receptor coating overlying the first mentioned ink receptor coating with portions of said second ink receptor coating coating said registering surface portions of said second release liner.

11. A panel according to claim 8 including a substantially opaque layer on an opposite side of said sheetstock from said one side thereof for substantially blocking light transmission from said sheetstock through said opposite side of said panel from said image side, said opaque layer having perforations in registration with the perforations through said sheetstock.

12. A panel according to claim 11 including a poly-coated release liner releasably secured to said sheetstock along an opposite side thereof from said one side of said substrate and having perforations extending therethrough in registration with the perforations through the sheetstock and said opaque layer, a non-perforated second release liner releasably secured to said poly-coated release liner along a side thereof remote from said sheetstock, thereby registering surface portions of said second release liner with said registering perforations, said translucent materials comprising an ink, an ink receptor coating overlying said sheetstock for receiving said ink, a pressure-sensitive adhesive between said poly-coated release liner and said sheetstock and a heat-sensitive adhesive between said non-perforated liner and said poly-coated liner for releasably securing said liners to one another.

13. A panel according to claim 8 including a protective layer of non-perforated substantially optically clear material overlying said translucent materials.

14. A vision control panel comprising:
sheetstock including a pair of transparent electrode layers separated one from the other by a layer of electrically energized light-emitting material arranged in a grid pattern defining light-emitting portions and transparent non-light-emitting portions when electrically energized;
a layer of dark opaque material overlying one of said transparent electrode layers arranged in a grid pattern in registration with the grid pattern of said electrically energized light-emitting material and having transparent areas in registration with the non-light-emitting portions of said electrically energized light-emitting material and opaque portions in registration with light-emitting portions of said electrically energized light-emitting material; and
a layer of translucent material overlying another of said transparent electrode layers forming an image thereon and arranged in a grid pattern in registration with the grid patterns of said electrically energized light-emitting material and said dark opaque material, said translucent image-forming material having image-forming portions in registration with the light-emitting portions of said electrically energized light-emitting material, said translucent image-forming material having transparent areas in registration with the non-light-emitting portions of said electrically energized light-emitting material and said transparent areas of said dark opaque material, respectively, the size of the transparent areas of the translucent image-forming material in registration with the non-light-emitting portions of said electrically energized light-emitting material being smaller than the size of the non-light-emitting portions of said electrically energized light-emitting material to substantially preclude light-emitting formations about the image-forming portions of said translucent forming material;
whereby an observer on the imaged side of said panel sees an illuminated image upon electrical energization of the light-emitting material and an observer on an opposite side of the panel sees through the panel but without seeing the image.

15. A panel according to claim 14 wherein said grid patterns include one of lines or discrete dots forming said light-emitting portions of said electrically energized light-emitting material and said transparent areas of said dark opaque material and said translucent material.

16. A vision control panel comprising:
sheetstock including a pair of transparent electrode layers separated one from the other by a layer of electrically energized light-emitting material arranged in a grid pattern defining light-emitting portions and non-light-emitting portions when electrically energized;
a layer of translucent material overlying each of said transparent electrode layers forming first and second images on respective opposite sides of the panel and arranged in a grid pattern in registration with the grid pattern of said electrically energized light-emitting material, each of said translucent image-forming materials having transparent areas in registration with the non-light-emitting portions of said electrically energized light-emitting material, and image-forming portions in registration with light-emitting portions of said electrically energized light-emitting material, the size of the transparent areas of the layers of translucent material in registration with the non-light-emitting portions of the electrically energized light-emitting material being smaller than the size of the non-light-emitting portions of the electrically energized light-emitting material to substantially preclude light-emitting formations about the image-forming portions of said translucent layers;
whereby an observer on one imaged side of said panel sees an illuminated image and an observer on an opposite image side of the panel sees an illuminated second image.

17. A panel according to claim 16 including a non-translucent opaque ink on said one imaged side of said panel in a discrete area thereof defining a non-illuminated see-through area of said panel adjacent said illuminated first image.

18. A vision control panel according to claim 14 wherein the size of the transparent areas of the dark opaque material in registration with the non-light-emitting portion of the electrically energized light-emitting material is smaller than the size of the non-light-emitting portion of the layer of electrically energized light-emitting material to substantially preclude emission of light through the transparent areas of the dark opaque material.

19. A vision control panel according to claim 14 wherein the image-forming portions of said translucent material in part overlap the non-light-emitting portions of said sheetstock to minimize or eliminate from view light transmitted from the light-emitting portions of said sheetstock into the non-light-emitting portions thereof.

20. A vision control panel according to claim 14 wherein the opaque portions of said opaque material in part overlap the non-light-emitting portions of said sheetstock to minimize or eliminate from view light transmitted from the light-emitting portions of said sheetstock into the non-light-emitting portions thereof.

21. A vision control panel according to claim 14 wherein the image-forming portions of said translucent material in part overlap the non-light-emitting portions of said sheetstock to minimize or eliminate from view light transmitted from the light-emitting portions of said sheetstock into the non-light-emitting portions thereof, the opaque portions of said opaque material in part overlapping the non-light-emitting portions of said sheetstock to minimize or eliminate from view light transmitted from the light-emitting portions of said sheetstock into the non-light-emitting portions thereof.

22. A vision control panel comprising:
   a substrate of electrically energizable light-emitting material arranged in a grid pattern defining light-emitting portions and transparent non-light-emitting portions when electrically energized;
   a layer of dark opaque material overlying one side of said substrate arranged in a grid pattern in registration with the grid pattern of said electrically energized light-emitting material and having transparent areas in registration with the non-light-emitting portions of said electrically energized light-emitting material and opaque portions in registration with light-emitting portions of said electrically energized light-emitting material; and
   a layer of translucent material overlying another side of said substrate forming an image thereon and arranged in a grid pattern in registration with the grid patterns of said electrically energized light-emitting material and said dark opaque material, said translucent image-forming material having image-forming portions in registration with the light-emitting portions of said electrically energized light-emitting material, said translucent image-forming material having transparent areas in registration with the non-light-emitting portions of said electrically energized light-emitting material and said transparent areas of said dark opaque material, respectively, the size of the transparent areas of the translucent image-forming material in registration with the non-light-emitting portions of said electrically energized light-emitting material being smaller than the size of the non-light-emitting portions of said electrically energized light-emitting material to substantially preclude light-emitting formations about the image-forming portions of said translucent forming material;
   whereby an observer on the imaged side of said panel sees an illuminated image upon electrical energization of the light-emitting material and an observer on an opposite side of the panel sees through the panel but without seeing the image.

23. A panel according to claim 22 wherein said grid patterns include one of lines or discrete dots forming said light-emitting portions of said electrically energized light-emitting material and said transparent areas of said dark opaque material and said translucent material, the size of the transparent areas of the dark opaque material in registration with the non-light-emitting portion of the electrically energized light-emitting material being smaller than the size of the non-light-emitting portion of the layer of electrically energized light-emitting material to substantially preclude emission of light through the transparent areas of the dark opaque material, said substrate including a pair of electrode layers, at least one of which is transparent.

* * * * *